Patented Feb. 5, 1924.

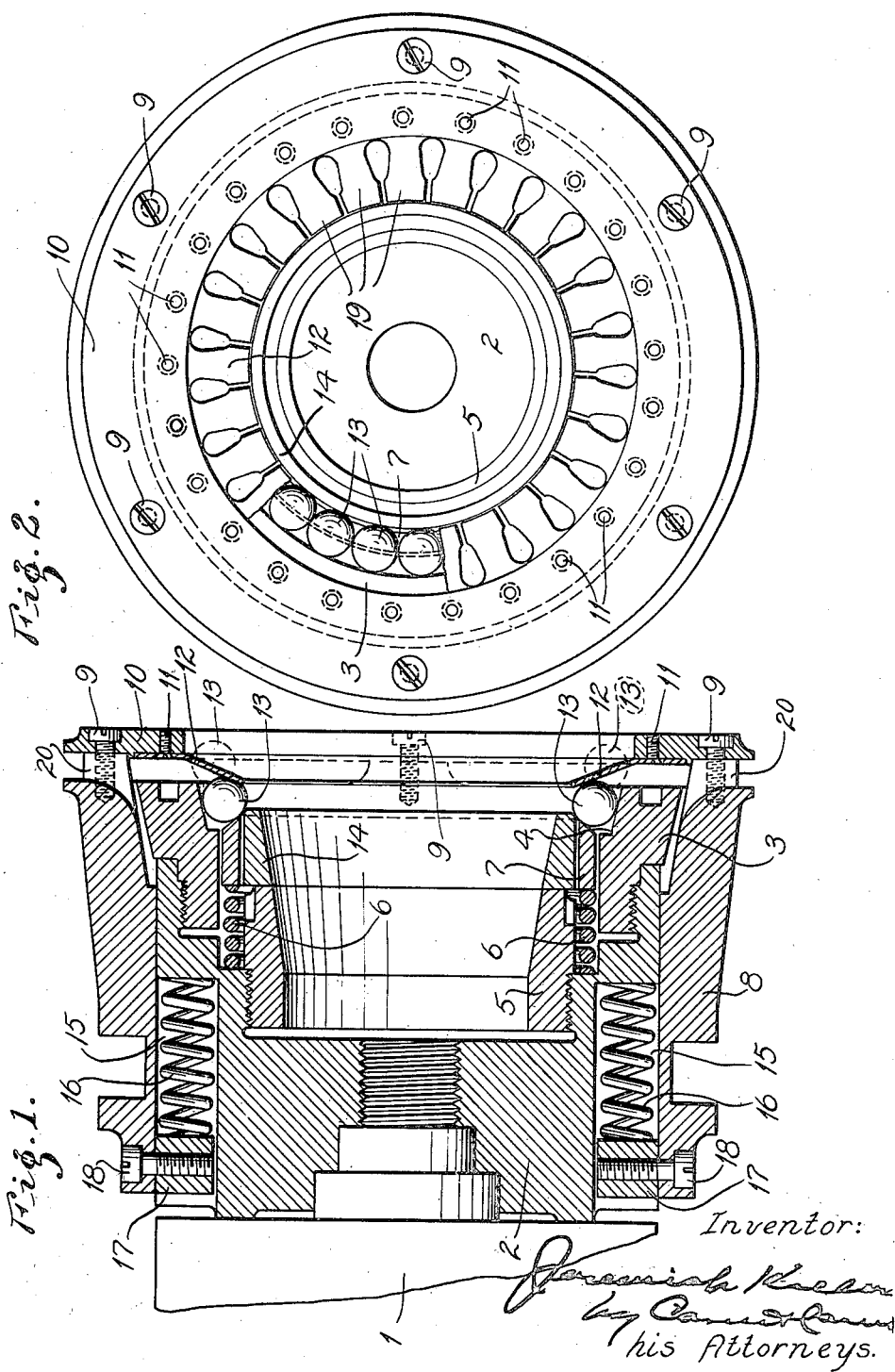

1,482,566

UNITED STATES PATENT OFFICE.

JEREMIAH KELLER, OF CANTON, OHIO, ASSIGNOR TO THE TIMKEN ROLLER BEARING COMPANY, OF CANTON, OHIO, A CORPORATION OF OHIO.

CHUCK.

Application filed September 2, 1922. Serial No. 585,931.

*To all whom it may concern:*

Be it known that I, JEREMIAH KELLER, a citizen of the United States, and a resident of the city of Canton, county of Stark, and State of Ohio, have invented a new and useful Improvement in Chucks, of which the following is a specification.

My invention relates to chucks or mandrels for holding tubular articles, such as roller bearing cups in position on a lathe or the like to have a surface thereof operated on by a cutting or grinding tool and has for its principal object to make a chuck that will accurately center and hold such articles in position and that will permit the easy escape of lubricant from the work. The invention consists in the parts and combinations of parts hereinafter described and claimed.

In the drawings which form part of this specification and wherein like reference numerals indicate like parts wherever they occur, Fig. 1 is a sectional view of a chuck embodying my invention; and Fig. 2 is an end view thereof.

Mounted on the threaded end of the rotary spindle 1 of a lathe or the like is a hollow chuck body 2. The enlarged outer end portion of the bore of the chuck body is threaded to receive a threaded sleeve 3, the outer end 4 of whose bore is enlarged and preferably slightly tapered. The portion of the bore of the chuck body adjacent to the threaded outer end is smaller and smooth, and the portion next to it is still smaller and threaded to receive the threaded end of a hollow shell 5. The middle portion of the bore of the chuck body and the bore of the outer sleeve 3 are of substantially the same diameter. Mounted in the space between said shell 5 and the sleeve 3 and chuck body 2 is a spring 6 that bears against a ring 7 having a beveled outer end. Slidably mounted on the chuck body is a tubular member 8 having a bore that flares at the end. Secured to the end of said tubular member 8 as by screws 9 is a ring 10, and secured to said ring 10 as by screws 11 is an annular ring 12 of spring metal whose inner peripheral portion is bent toward the chuck body. Held between said sleeve 3, spring 12 and beveled ring 7 is a circular series of balls 13. The balls are adapted to bear against a roller bearing cup 14 or the like disposed in the chuck and abutting against the end of the shell 5 in the chuck body.

Mounted in grooves 15 in the chuck body are coil springs 16. At the ends said springs bear against blocks 17 secured to the tubular member 8 as by screws 18 and projecting into the grooves.

The springs 16 tend to keep the parts in the position shown in the drawing so that a roller bearing cup 14 is firmly held in the chuck to be ground. Preferably the spring ring 12 is slotted to form a multiplicity of spring fingers 19, each of which can yield to the extent required by the ball against which it presses. Thus a cup can be firmly held for grinding the bore thereof, even though the end thereof is not accurately finished.

During the grinding the bore of the cup is flooded with a suitable liquid. The tubular member 8 is provided with slots 20 in line with the balls to facilitate the escape of this liquid. The flaring shape of the tubular member prevents the liquid from flowing back into the chuck body.

The tubular member is provided with a groove to receive the end of a lever for releasing the chuck. If the tubular member is forced along the chuck body against the pressure of the springs, the spring ring is moved away from the balls and the beveled ring forces the balls to follow, releasing the cup, as indicated in dotted lines in Fig. 1.

The balls are centered by the sleeve in the end of the chuck body and are not affected by looseness or eccentricity of the tubular member. The spring ring holds each ball firmly against the work.

Obviously numerous changes may be made without departing from my invention and I do not wish to be limited to the precise construction shown.

What I claim is:

1. A chuck comprising a body having a bore with a flaring outer end and having an abutment in said bore for annular work, a circular series of balls arranged to bear against the flaring wall of said body and said work, a spring pressed ring slidable longitudinally in said bore outside of said work, and means for exerting pressure inwardly against said balls, the outer end edge of said ring being beveled and bearing against said balls.

2. A chuck comprising a body having a bore with a flaring outer end and having an abutment in said bore for annular work, a circular series of balls arranged to bear against the flaring wall of said body and said work, a spring pressed ring slidable longitudinally in said bore outside of said work, and means for exerting pressure inwardly against said balls said means comprising a circular series of spring fingers, the outer end edge of said ring being beveled and bearing against said balls.

3. A chuck for holding annular articles comprising a centrally bored chuck body, a sleeve mounted in the end of the bore thereof, a hollow shell forming an abutment and mounted in a reduced portion of the bore of the chuck body and overlapping said sleeve, a ring mounted in said sleeve, a spring mounted in the space between said shell and said sleeve and pressing against said ring, a ring overlapping the end of said sleeve, a circular series of balls held between said sleeve and said rings and means on said last named ring for pressing on said balls in a direction substantially parallel with the axis of the chuck whereby said balls press against the work to hold it in position.

4. A chuck for holding annular articles comprising a centrally bored chuck body, a sleeve mounted in the end of the bore thereof, a hollow shell forming an abutment and mounted in a reduced portion of the bore of the chuck body and overlapping said sleeve, a ring mounted in said sleeve, a spring mounted in the space between said shell and said sleeve and pressing against said ring, a ring of spring metal overlapping the end of said sleeve, a circular series of balls held between said sleeve and said rings and means on said last named ring for moving said spring metal ring axially of the chuck whereby said balls are caused to press against the work to hold it in position.

5. A chuck for holding annular articles comprising a centrally bored chuck body, a sleeve mounted in the end of the bore thereof, a hollow shell forming an abutment and mounted in a reduced portion of the bore of the chuck body and overlapping said sleeve, a ring mounted in said sleeve, a spring mounted in the space between said shell and said sleeve and pressing against said ring, a circular series of spring fingers overlapping the end of said sleeve, a circular series of balls held between said sleeve and said ring and said fingers and means on said last named ring for pressing said spring fingers against said balls from the end of the chuck whereby said balls press against the work to hold it in position.

6. A chuck for holding annular articles comprising a centrally bored chuck body, a sleeve mounted in the end of the bore thereof, a hollow shell forming an abutment and mounted in a reduced portion of the bore of the chuck body and overlapping said sleeve, a ring having a beveled end mounted in said sleeve, a spring mounted in the space between said shell and said sleeve and pressing against said ring, a ring overlapping the end of said sleeve, a circular series of balls held between said sleeve and said rings and means on said last named ring for pressing said last mentioned ring against said balls whereby said balls press againt the work to hold it in position, said means comprising a tubular member supporting said ring from its end and slidable on the chuck body.

7. A chuck for holding annular articles comprising a centrally bored chuck body, a sleeve mounted in the end of the bore thereof, a hollow shell forming an abutment and mounted in a reduced portion of the bore of the chuck body and overlapping said sleeve, a ring having a beveled end mounted in said sleeve, a spring mounted in the space between said shell and said sleeve and pressing against said ring, a ring overlapping the end of said sleeve, a circular series of balls held between said sleeve and said rings and means on said last named ring for pressing said last mentioned ring against said balls whereby said balls press against the work to hold it in position, said means comprising a tubular member supporting said ring from its end and slidable on the chuck body, and said tubular member having a plurality of slots therethrough to permit escape of liquid from the chuck.

Signed at Canton, Ohio, this 29th day of Aug., 1922.

JEREMIAH KELLER.